(12) United States Patent
Takahashi et al.

(10) Patent No.: US 7,234,149 B2
(45) Date of Patent: Jun. 19, 2007

(54) DISK APPARATUS HAVING A SUPPORT MEMBER

(75) Inventors: Shoji Takahashi, Hanno (JP); Maki Wakita, Sayama (JP); Takuro Kohyama, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 513 days.

(21) Appl. No.: 10/484,967

(22) PCT Filed: Aug. 6, 2002

(86) PCT No.: PCT/JP02/08013

§ 371 (c)(1),
(2), (4) Date: Jan. 28, 2004

(87) PCT Pub. No.: WO03/017279

PCT Pub. Date: Feb. 27, 2003

(65) Prior Publication Data

US 2004/0233799 A1 Nov. 25, 2004

(30) Foreign Application Priority Data

Aug. 16, 2001 (JP) ............................. 2001-247405
Oct. 30, 2001 (JP) ............................. 2001-333005

(51) Int. Cl.
*G11B 17/03* (2006.01)
(52) U.S. Cl. ..................................... 720/601

(58) Field of Classification Search ..................... None
See application file for complete search history.

(56) References Cited

U.S. PATENT DOCUMENTS 5,831,956 A    11/1998  Sawai et al. ............... 720/600
6,151,284 A *  11/2000  Watanabe et al. ........... 720/601

FOREIGN PATENT DOCUMENTS

JP           7-57362        3/1995
JP          10-199207       7/1998

OTHER PUBLICATIONS

JP 10-199207 Machine Translation.*

* cited by examiner

*Primary Examiner*—David Davis
(74) *Attorney, Agent, or Firm*—Smith, Gambrell & Russell, LLP

(57) ABSTRACT

A guide member (20) is disposed between a body chassis (2) of a disk driving apparatus (1) and an electric connection wire (15). The guide member (20) moves together with a tray (3) to prevent the body chassis (2) and the electric connection wire (15) from coming into contact with each other and moving. In a state in which the tray (3) is sufficiently pulled out from the body chassis (2), the guide member (20) projects from the tray (3) to prevent the electric connection wire (15) from coming into contact with the body chassis (2).

19 Claims, 14 Drawing Sheets

DISK APPARATUS HAVING A SUPPORT MEMBER

TECHNICAL FIELD

The present invention relates to a disk driving apparatus for driving an information recording disk such as a compact disk (CD) and a digital video disk (DVD) for reading or writing information from or into the disk.

BACKGROUND TECHNIQUE

One example of a conventional disk driving apparatus will be explained with reference to FIGS. 14 and 15.

A disk driving apparatus 1 comprises a body chassis 2 and a tray 3 which can slide with respect to the body chassis 2. The tray 3 comprises a tray base 4 made of synthetic resin, and a thread chassis 5 fitted and fixed to the tray base 4. The thread chassis 5 comprises a thread base 6 into which a spindle motor 50 and a head driving mechanism are incorporated, and a metal cover for covering both upper and lower surfaces of the thread base 6. In FIG. 14, a reference numeral 8 represents a head, and a reference numeral 9 represents a rotary table 9. An auxiliary circuit substrate 12 for controlling the spindle motor 50 and the head driving mechanism is disposed in the tray 3.

A main circuit substrate 11 is disposed in the body chassis 2. A connector 13 of the main circuit substrate 11 and a connector 14 of the auxiliary circuit substrate 12 are interconnected through an FPC (flexible printed circuit) 51. The FPC 51 is formed into a U-shape as a whole in which a conductive path is formed on a polyester film by printing technique.

A first end of the FPC 51 is connected to the connector 13 of the main circuit substrate 11. A straight line portion connected to the first end (portion 51a closer to the body chassis) is fixed on to the body chassis 2. A straight line portion (portion 51b closer to the tray) connected to a second end of the FPC 51 is once brought upward and then is folded back substantially at an angle of 180° toward the tray 3 as shown in FIG. 14. The folded back second end 51b of the FPC 51 is connected to the connector 14 of the auxiliary circuit substrate 12. A part of the FPC 51 which is folded back at the portion 51b closer to the tray toward the tray 3 is formed with a folded-back curved portion 19 having a U-shaped cross section.

When the tray 3 is pulled out from the body chassis 2 or pushed into the body chassis 2, the tray 3 moves and the portion 51b of the FPC 51 closer to the tray also moves together, and the folded-back curved portion 19 also moves in the same direction at a half speed of the moving speed of the tray 3. In this manner, even when the tray 3 moves toward or away from the body chassis 2, the connected state between the connector 13 of the main circuit substrate 11 and the connector 14 of the auxiliary circuit substrate 12 is always maintained through the FPC 51.

When rigidity (spring force) of a base member of the FPC 51 is excessively high, however, a radius of curvature of the folded-back curved portion 19 becomes great and a part of the folded-back curved portion 19 rises high and this portion abuts an upper lid 2a of the body chassis 2 and pushes the same. When the tray 3 is pulled out from the body chassis 2 or pushed into the body chassis 2 in this state, the folded-back curved portion 19 comes into contact with the upper lid 2a and it becomes difficult for the folded-back curved portion 19 to move due to friction and thus, the radius of curvature of the folded-back curved portion 19 tries to further increase. As a result, there is an adverse possibility that it becomes difficult to move the folded-back curved portion 19 or a part of the FPC 51 rub against the upper lid 2a of the body chassis 2 by this movement and is damaged.

To solve this problem, Japanese Patent Application Laid-open No. 10-199207 discloses a technique in which a guide sheet made of polyethylene terephthalate which moves together with the tray is interposed between the body chassis and the FPC, thereby preventing the folded-back curved portion of the FPC from coming into contact directly with and rubbing against the upper lid of the body chassis.

However, since the polyethylene terephthalate which is a material of the guide sheet used for preventing the friction between the body chassis and the FPC has low bending rigidity, the guide sheet itself is bent by the friction with the body chassis, and there is a problem that smooth sliding motion of the tray is impaired.

To solve such a problem, when the bending rigidity of the FPC 51 is lowered by reducing a thickness of the base member of the FPC 51 or using softer material, the radius of curvature of the folded-back curved portion 19 becomes relatively small and a case in which a part of the FPC 51 strongly pushes the upper lid 2a of the body chassis 2 can be avoided. When the tray 3 is at an unload position, however, a part of the portion 51b of the FPC 51 closer to the tray lops from a gap W formed between (the lower cover 7b of) the thread chassis 5 and the body chassis 2, as shown in FIG. 5 and protrudes from the thread chassis 5.

When the tray 3 is pushed into the body chassis in a state in which the FPC 51 lops from the gap W between the thread chassis 5 and the body chassis 2, there is an adverse possibility that the lopping FPC 51 is sandwiched between the body chassis 2 and the thread chassis 5.

SUMMARY OF THE INVENTION

In the disk driving apparatus, when a flexible electric connection wire, which electrically connects an electronic component mounted in the tray and an electronic component mounted in the body chassis with each other, bends and moves as the tray moves. Thus, it is an object of the present invention to prevent a part of the bent electric connection wire from coming into contact with the body chassis and rubbing against the body chassis.

To achieve the above object, according to one aspect of the present invention, there is provided a disk driving apparatus having a body chassis, and a tray which can slide between a first position where the tray is pulled out from the body chassis and a second position where the tray is pushed into the body chassis, the apparatus further comprising a flexible electric connection wire for electrically connecting an electronic component mounted to the tray and an electronic component mounted to the body chassis with each other, and a guide member disposed between a part of the body chassis and the electric connection wire for preventing the electric connection wire and the body chassis from coming into contact with each other, wherein when the tray is separated away from the second position toward the first position by a predetermined distance or more, the guide member projects from the tray to prevent the electric connection wire from coming into contact with the body chassis, and when the tray moves toward the second position and a distance between the tray and the second position becomes the predetermined or less, a projecting amount of the guide member from the tray is reduced.

Further, the tray can be provided with a support member. When the tray moves from the first position to the second position and a part of the electric connection wire lops and projects out from the body chassis, the support member limits a position of the projecting portion in its height direction.

DESCRIPTION OF THE PREFERRED EMBODIMENTS (Entire Structure of a Disk Driving Apparatus)

Figure 1:
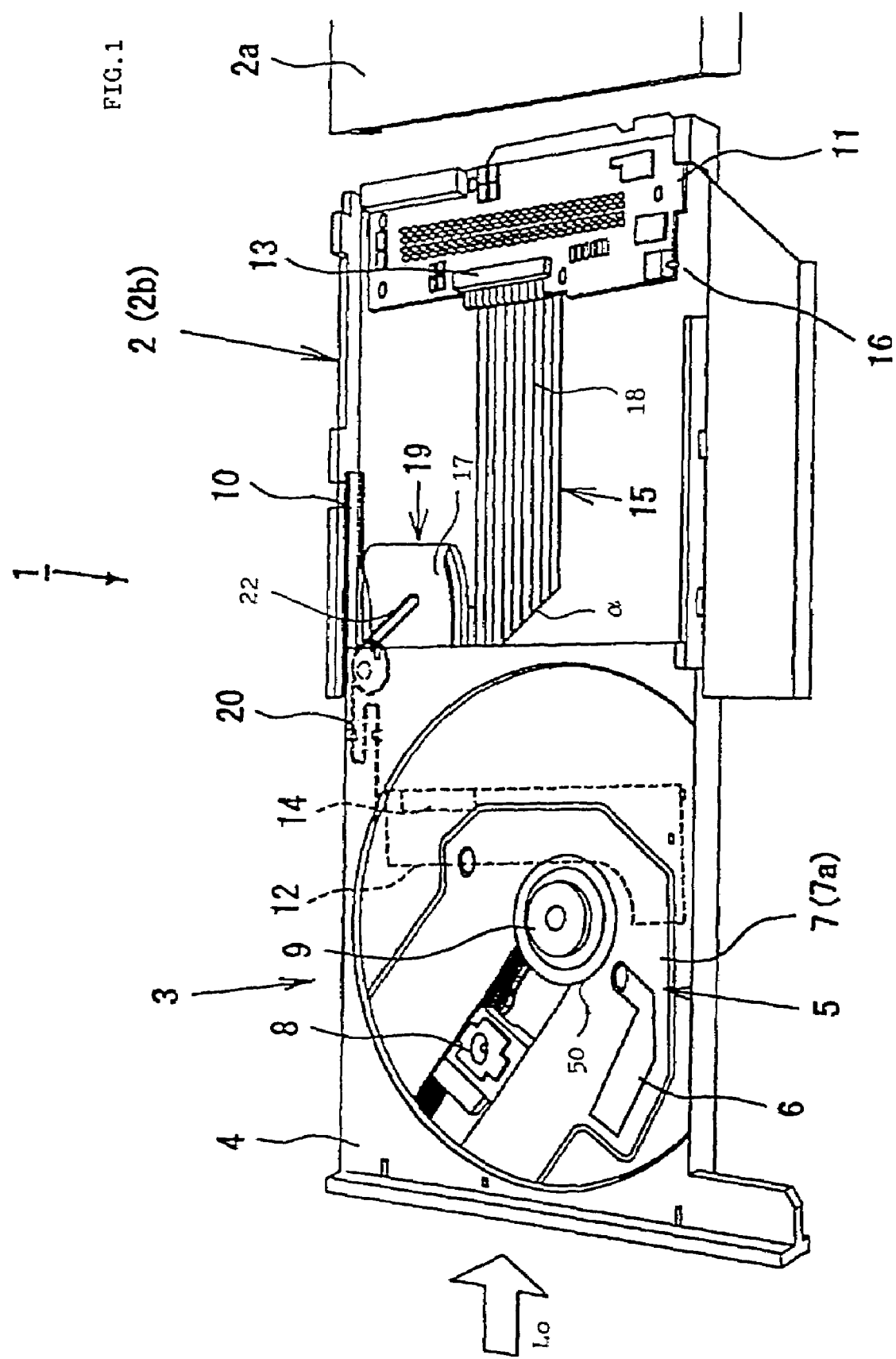
FIG. 1 is a diagram of an entire structure of a disk driving apparatus according to an embodiment of the present invention as viewed from diagonally above with an upper lid of a body chassis removed.

As shown in FIG. 1, a disk driving apparatus 1 comprises a body chassis 2 and a tray 3, and is incorporated in a small computer (hereinafter referred to as parent apparatus).

The body chassis 2 is a box-like structure having an upper lid 2a, and is formed by press forming a steel plate.

The tray 3 comprises a tray base 4 made of synthetic resin, and a thread chassis 5 fitted and fixed to the tray base 4. The thread chassis 5 comprises a thread base 6 made of synthetic resin into which a spindle motor 50 and a head mechanism are incorporated, and a metal covers 7a (FIG. 1) and 7b (FIG. 2) for covering upper and lower surfaces of the thread base 6. As shown in a lower portion in FIG. 2, the cover 7b is square and constitutes an electric component mounted to the tray 3 and a grounding portion which becomes a tray side grounding potential.

In FIG. 1, a reference numeral 8 represents a head, and a reference numeral 9 represents a rotary table. The rotary table 9 is driven by a spindle motor 50 incorporated in the thread base 6. A chuck on which a disk is to be mounted projects from a central portion of the rotary table 9.

Figure 2:
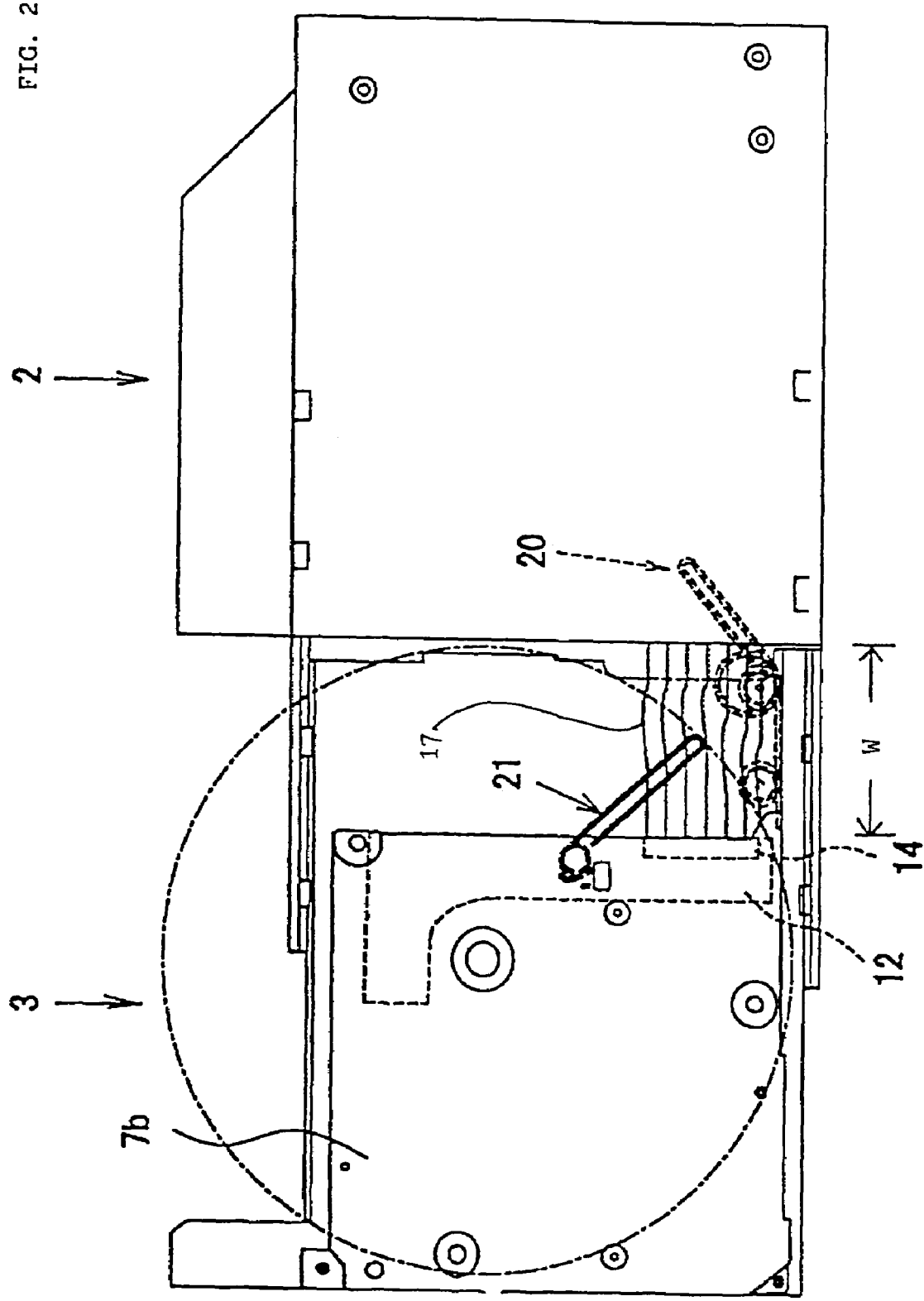
FIG. 2 is a diagram of the disk driving apparatus shown in FIG. 1 as viewed from below, and the tray is in a state in which the tray is pulled out from the body chassis (unload position).

The tray 3 can slide straightly forward and backward with respect to the body chassis 2 by linear guide rails 10 mounted to left and right sides of the tray base 4. The tray 3 shown in FIGS. 1 and 2 is in a position pulled out from the body chassis 2 (for this position, hereinafter referred to as unload position). When the tray 3 is at the unload position, the disk can be mounted to or removed from the tray 3.

In the drawings, arrows Lo indicate a pushing direction of the tray 3 toward the body chassis 2.

Figure 3:
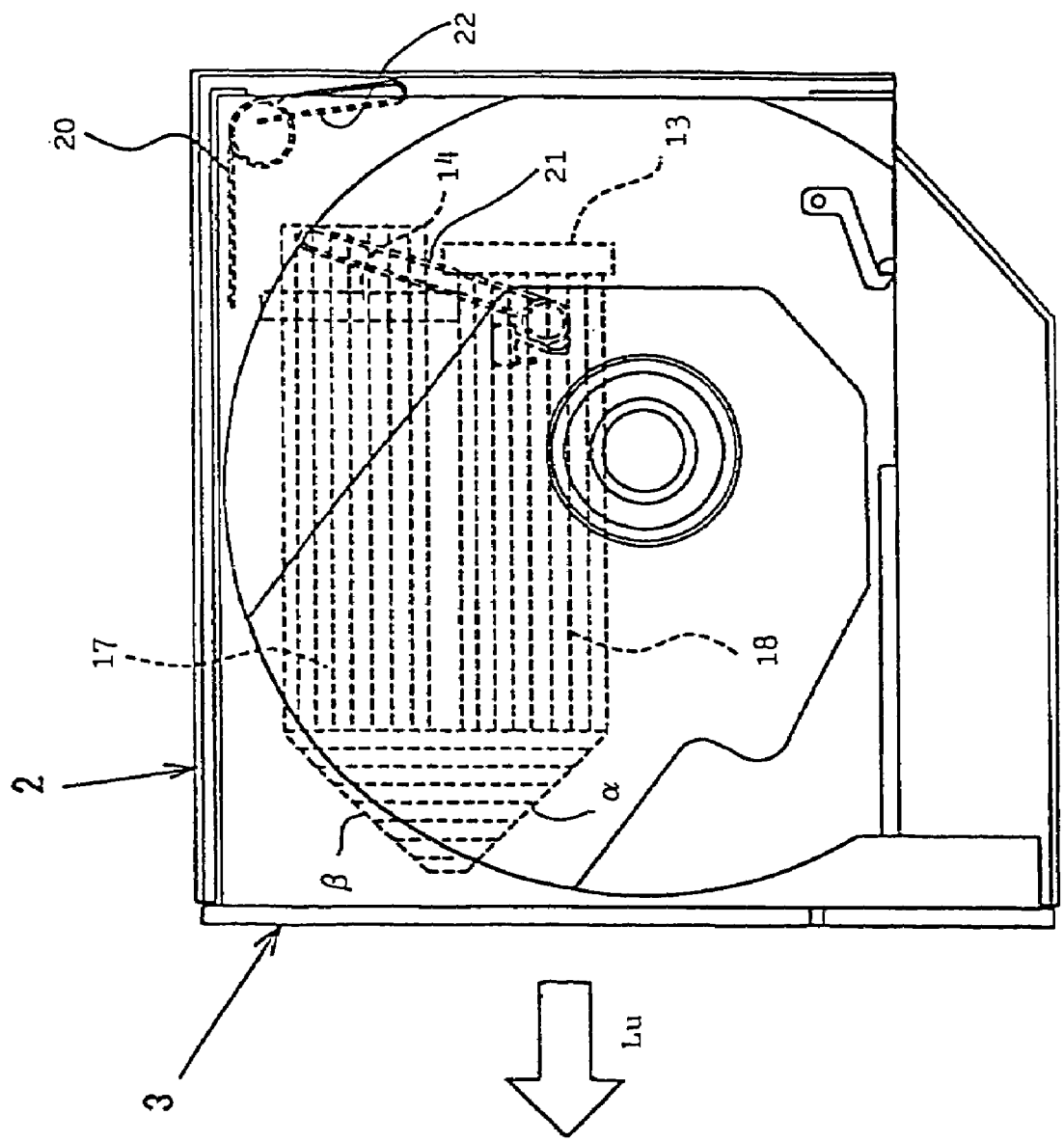
FIG. 3 is a diagram of the disk driving apparatus shown in FIG. 1 as viewed from above, and the tray is in a state in which the tray is pushed into the body chassis (load position).

When the tray 3 located at the unload position is pushed into the body chassis 2 (see arrow Lo in FIG. 1), the tray 3 comes to a position substantially superposed on the body chassis 2 as shown in the plan view of FIG. 3 (for this position, hereinafter referred to as load position), and the tray 3 is locked to the body chassis 2. A limit switch 16 mounted to the body chassis 2 (FIG. 1) detects that the tray 3 reaches the load position. When the tray 3 is at the load position, the disk is rotated by the spindle motor. In FIG. 3, an arrow Lu indicates a pulling out direction of the tray 3 from the body chassis 2.

A main circuit substrate 11 is mounted to the body chassis 2. An auxiliary circuit substrate 12 is mounted to the tray 3. A connector 13 of the main circuit substrate 11 and a connector 14 of the auxiliary circuit substrate 12 are interconnected through a flexible flat cable (FFC) 15. A command from the parent apparatus is analyzed by the main circuit substrate 11 on the body chassis 2, and transmitted to the auxiliary circuit substrate 12 on the tray 3. The auxiliary circuit substrate 12 directly controls the spindle motor 50 mounted on the tray 3 and a thread motor which moves the head 8, and manages input of data to the head 8 or output of data from the head 8.

The FFC 15 is a general-purpose electric connection wire designed for electronic equipment, and the FFC 15 is formed by disposing 40 thin conductors in parallel to each other on a resin film into a thin band-like shape. The FFC 15 is provided with flat terminals at its first end and a second end which is opposite from the first end. As the FFC 15, a "Sumi card" (trade name) produced by Sumitomo Electric Industries, Ltd. (Japanese company) is utilized. The FFC 15 can freely be bent, and the FFC 15 has such a rigidity that when it is folded back at its arbitrary position in its longitudinal direction, a part of the FFC 15 folded back has U-shaped cross section.

In this embodiment, a straight band-like FFC 15 is used. A manner to apply the FFC 15 to the disk driving apparatus 1 will be explained with reference to FIG. 4.

The terminal provided on the first end of the FFC 15 is connected to the connector 13 of the body chassis 2 and then, the FFC 15 is extended in the pulling out direction of the tray onto the body chassis 2. Then, the FFC 15 extended onto the body chassis 2 is bent leftward along a first bending line α which is inclined at an angle of 45° at an intermediate portion of the FFC 15, and is further bent toward the main circuit substrate 11 along a second bending line β which is inclined at an angle of 45°.

When a straight line portion of the FFC 15 from the first end to the first bending line α is called a first portion 18, and a straight line portion of the FFC 15 from the second bending line β to the second end is called as a second portion 17, the first portion 18 and the second portion 17 are arranged in parallel to each other (see dot lines in FIG. 3).

The first portion 18 of the FFC 15, and a portion of a triangle having the first bending line α and the second bending line β as two sides thereof are adhered onto the body chassis 2 using a double-faced tape or the like.

Figure 4:
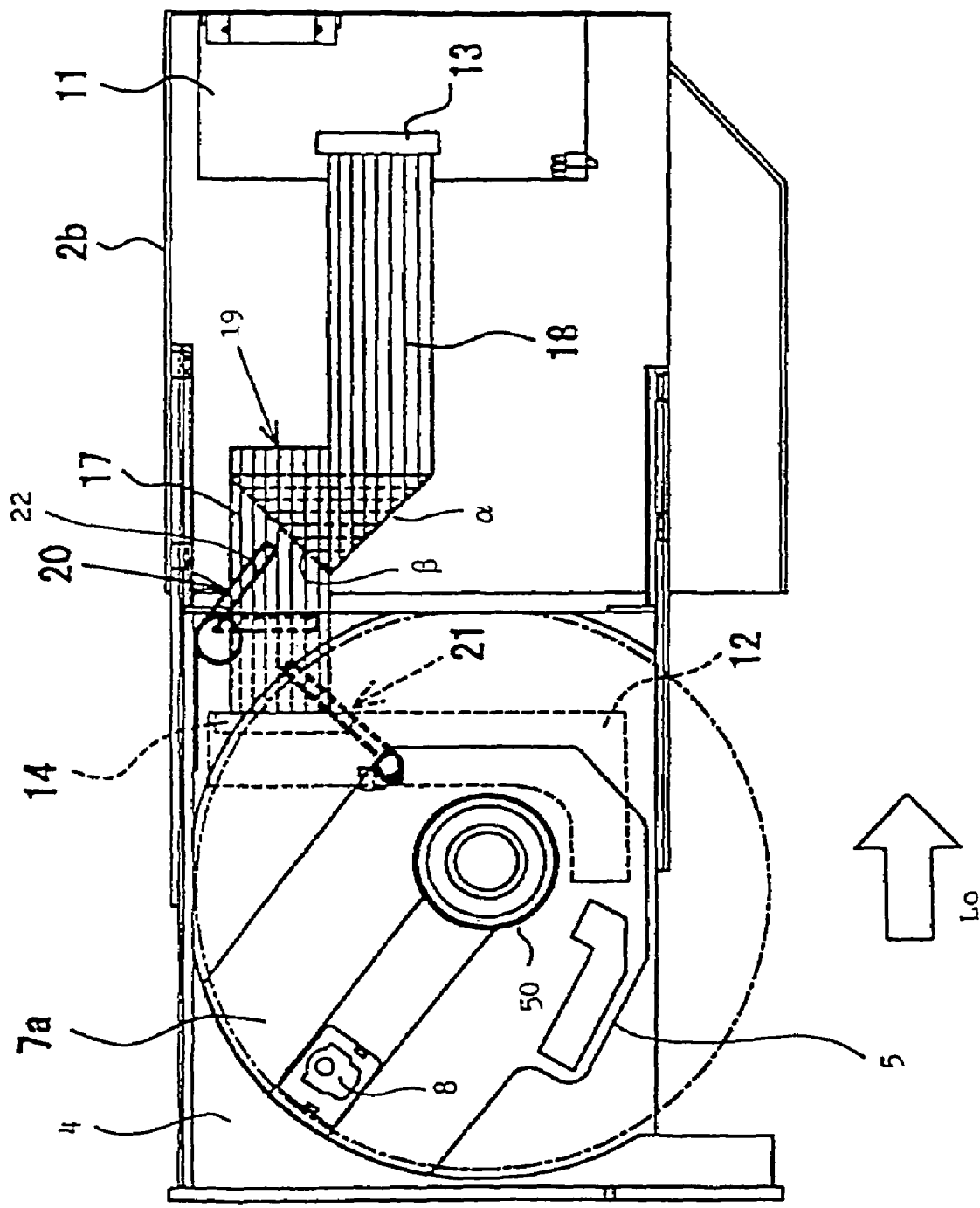
FIG. 4 is a diagram of the disk driving apparatus shown in FIG. 1 as viewed from above, the tray is at the unload position and the upper lid of the body chassis is removed for showing a connection of an inside FFC.

As shown in FIGS. 1 and 4, the second portion 17 of the FFC 15 is folded back toward the tray 3, the terminal provided on the second end of the FFC 15 is connected to the connector 14 of the tray 3. The folded-back portion of the FFC 15 (for this portion, hereinafter referred to as folded-back curved portion) has a U-shaped cross section as shown with a reference numeral 19 in FIG. 1.

As shown in FIGS. 2 and 4, a guide member 20 and a support member 21 are disposed on an end (rear end) of the tray 3 closer to the body chassis 2 at positions where they can engage with the second portion 17 of the FFC 15. The guide member 20 and the support member 21 will be explained below.

(First example of the guide member)

Figure 5A:
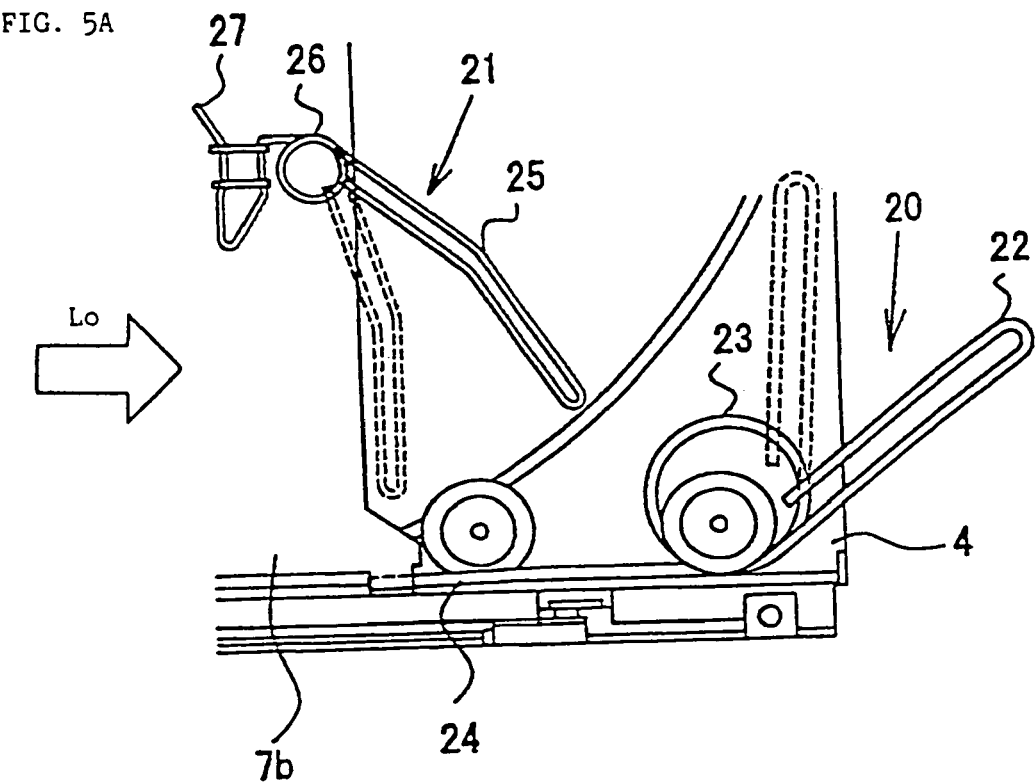
FIG. 5A is a partial plan view for explaining a mounting operation of a guide member and a support member to the tray of the disk driving apparatus shown in FIG. 1.
Figure 5B:
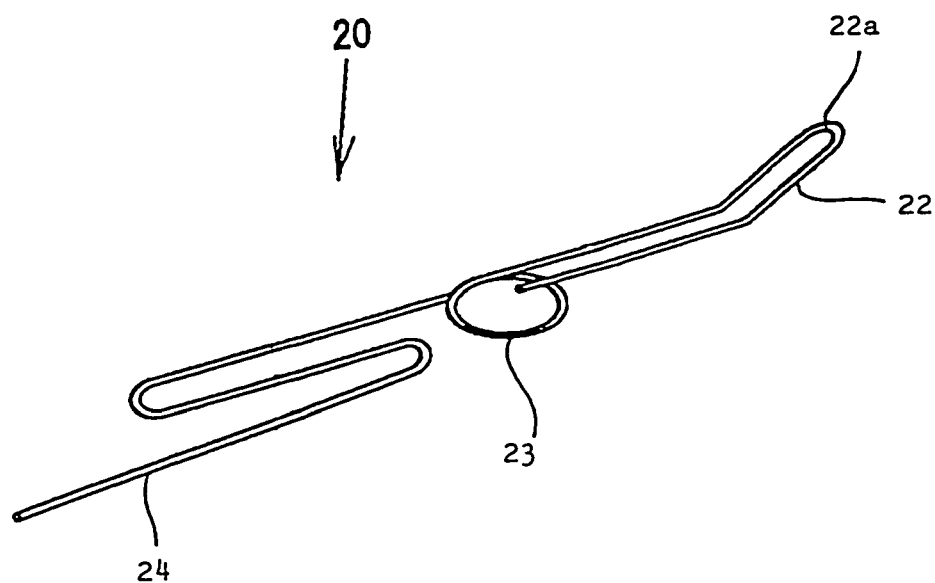
FIG. 5B shows a structure of the guide member shown in FIG. 5A.
Figure 6:
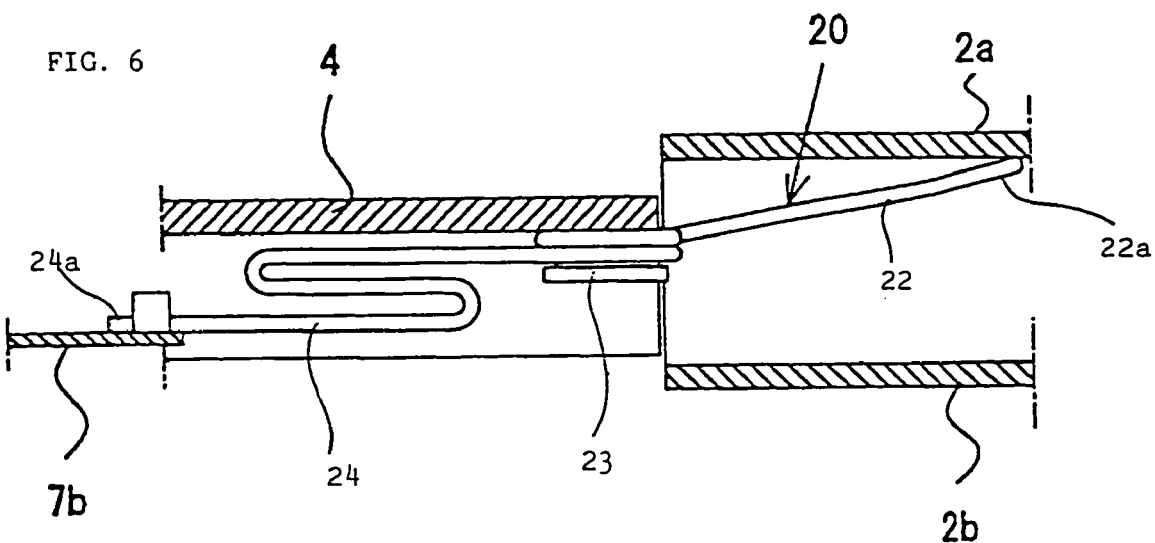
FIG. 6 is a partial front view for explaining that the body chassis (upper lid) and the tray (thread chassis) are interconnected through the guide member.

As shown in FIG. 5B, the guide member 20 is formed of one wire member of a spring steel, and the wire member is bent to form a projecting portion 22, a coil-like ring portion 23 and a support portion 24. The guide member 20 functions as a twisted coil spring. In a state in which the ring portion 23 is fitted to a shaft which rises on a lower surface of the tray base 4, as shown in FIG. 5A, the projecting portion 22 projects rearward from a rear end edge of the tray 3, and the support portion 24 extends forward and abuts against a left sidewall of the tray base 4. A front end 24*a* of the support portion 24 comes into contact with the lower cover 7*b* of the thread chassis 5 as shown in FIG. 6.

A length of the projecting portion 22 of the guide member 20 is set such that even when the tray 3 is pulled out to the unload position, its contact point 22*a* exists inside the body chassis 2, i.e., between the upper lid 2*a* and a bottom plate 2*b* of the body chassis 2. Therefore, as shown in FIG. 6, the contact point 22*a* of the projecting portion 22 is always in contact with the upper lid 2*a* of the body chassis 2 from a state in which the tray 3 is at the unload position to a state in which the tray 3 is at the load position.

Therefore, the upper lid 2*a* of the body chassis 2 and the lower cover 7*b* of the thread chassis 5 are always connected with each other through the guide member 20 which is a conductive material and thus, the grounding state on the side of the thread chassis 5 can always be secured.

The projecting portion 22 of the guide member 20 is disposed between the second portion 17 of the FFC 15 and the upper lid 2*a* of the body chassis 2. Since FIG. 4 is a plan view showing a state in which the upper lid 2*a* is removed from the body chassis 2, the projecting portion 22 of the guide member 20 can be seen above the second portion 17 of the FFC 15.

When the tray 3 located at the unload position is pushed toward the body chassis 2, as the tray 3 moves rearward, a folded-back curved portion 19 formed in the second portion 17 of the FFC 15 also moves rearward gradually. As the folded-back curved portion 19 moves rearward, a radius of curvature of the folded-back curved portion 19 tries to gradually increase by the rigidity of the FFC 15. However, as shown in FIGS. 1 and 4, since the projecting portion 22 of the guide member 20 lies down above the FFC 15 near the folded-back curved portion 19, the swelling up motion of the folded-back curved portion 19 is suppressed by the projecting portion 22 of the guide member 20. Therefore, when the tray 3 is moved from the unload position to the load position, (also when the tray 3 is moved from the load position to the unload position), the FFC 15 is prevented from coming into contact with the upper lid 2*a* and rubbing against the upper lid 2*a*.

Since both the second portion 17 of the FFC 15 and the projecting portion 22 of the guide member 20 move at the same speed as a sliding speed of the tray 3, no relative movement is generated between the projecting portion 22 of the guide member 20 and the second portion 17 of the FFC 15 when pushing the tray 3 toward the body chassis 2 or pulling out the tray 3 from the body chassis 2.

Therefore, the projecting portion 22 of the guide member 20 prevents the second portion 17 of the FFC 15 from swelling toward the upper lid 2*a* of the second portion 17, thereby preventing the FFC 15 from rubbing against the upper lid 2*a*, and the projecting portion 22 does not rub against the FFC 15.

As described above, when the tray 3 is at the unload position, the projecting portion 22 of the guide member 20 projects rearward from the rear end edge of the tray 3 (FIG. 5A), but when the tray 3 is pushed into the body chassis 2 to the load position, the projecting portion 22 of the guide member 20 abuts against a part of the body chassis 2 and is resiliently deformed. As a result, as shown with dotted lines in FIG. 5A, the projecting portion 22 is accommodated in the tray base 4.

A reaction force of the support portion 24 caused by the resilient deformation of the projecting portion 22 of the guide member 20 is received by a sidewall of the tray base 4. Therefore, when the tray 3 is at the load position, resilience acts on the projecting portion 22 and the tray 3 is always pushed in the pulling out direction with respect to the body chassis 2.

As explained above, the guide member 20 includes the projection which restrains the swelling up motion of the second portion of the FFC 15 toward the upper lid 2*a*. The guide member 20 also has a function for always pushing the tray 3 at the load position toward the unload position with respect to the body chassis 2.

As shown in FIG. 1, a tip end of the projecting portion 22 of the guide member 20 fixed to the tray 3 comes to a position away from the folded-back curved portion 19 of the FFC 15 in the pulling out direction of the tray 3 by a certain distance. In this regards, however, the projecting portion 22 may have any size and any attitude as far as the projecting portion 22 of the guide member 20 is between the upper lid 2*a* and the FFC 15 and the FFC 15 can be prevented from coming into contact with the upper lid 2*a*.

When the tray 3 is accommodated at the load position, as shown in FIG. 3 (dotted line in FIG. 5A), the tip end of the projecting portion 22 of the guide member 20 is pushed against the body chassis 2 and resiliently deformed so that the projecting portion 22 can be pulled onto the tray 3. Therefore, in a state in which the tray 3 is pushed into the load position and locked, the projecting portion 22 of the guide member 20 always pushes the tray 3 by its resilience toward the unload position. Thus, when the locked state of the tray 3 with respect to the body chassis 2 is released, the projecting portion 22 of the guide member 20 pushes the tray 3 toward the unload position by its resilience.

Further, the projecting portion 22 of the guide member 20 rotates the tray 3 at the load position on the body chassis 2 (in a horizontal plane) and pushes the tray 3 against a sidewall of the body chassis 2. As a result, a shake of the tray 3 with respect to the body chassis 2 which may be caused by friction between the tray 3 and the sidewall of the body chassis 2 is restrained. In this case, in order to prevent the tray 3 from actually turning with respect to the body chassis 2, a positioning resilient material may be disposed between the tray 3 and the sidewall of the body chassis 2.

(Support Member)

The support member 21 is provided for preventing the second portion 17 of the FFC 15 from loping from the gap formed between the body chassis 2 and the lower cover 7b of the thread chassis 5.

This support member 21 is formed by bending a spring steel wire material which has weaker repulsion than that of the wire material of the guide member 20. As shown in FIG. 5A, the support member 21 includes a projecting portion 25, a ring portion 26 and a support portion 27. The ring portion 26 of the support member 21 is fitted into a shaft projecting from a rear end (end closer to the body chassis 2) of the lower cover 7b of the thread chassis 5, and the support portion 27 is fixed to the lower cover 7b, thereby allowing the projecting portion 25 to project rearward from the lower cover 7b. As shown in FIG. 5A, the projecting direction of the projecting portion 25 of the support member 21 is different from the lengthwise direction of the projecting portion 22 of the guide member 20 by about 90°.

Figure 12:
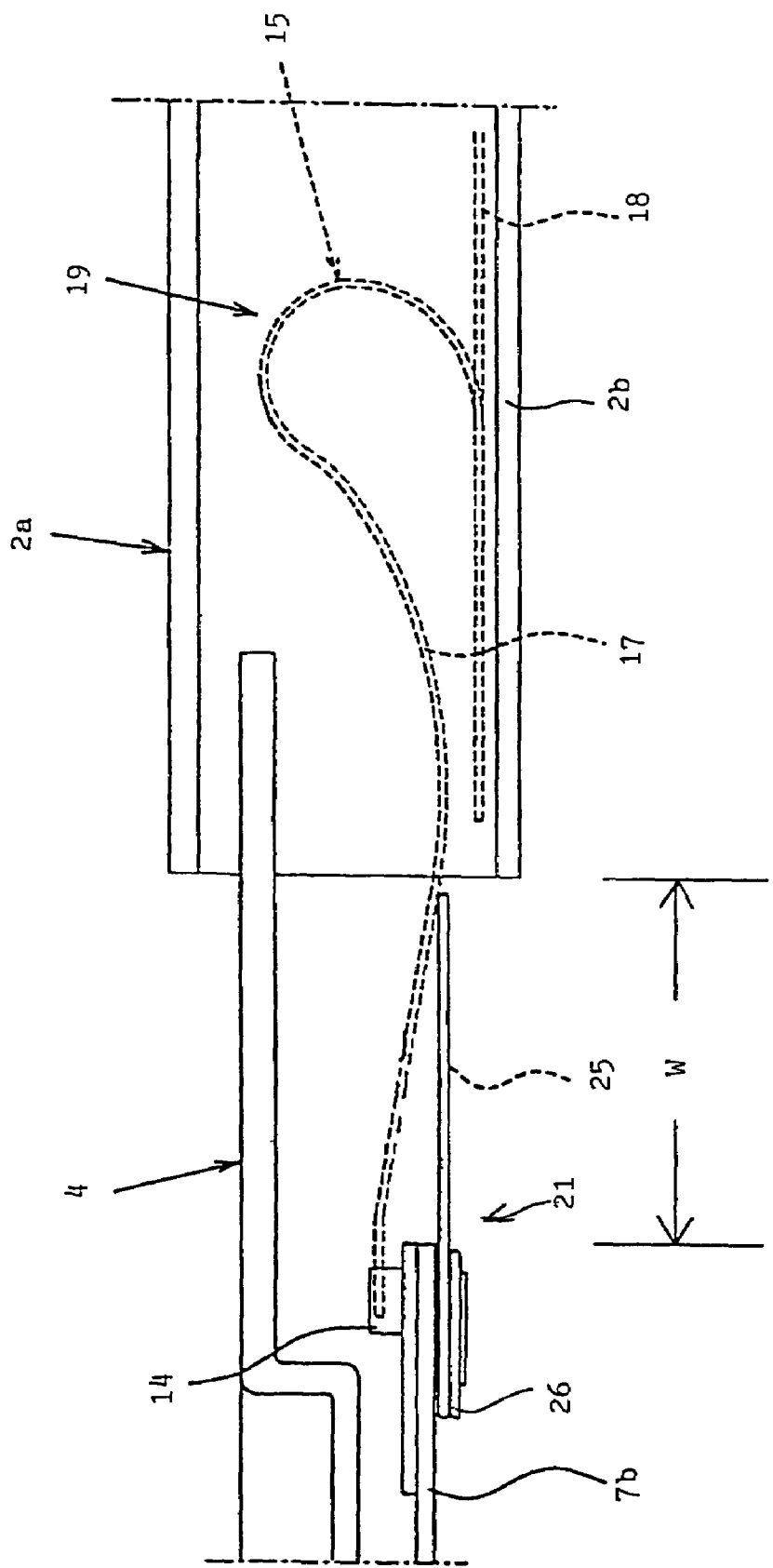
FIG. 12 is a partial side view for explaining that the support member mounted to a lower cover of the thread chassis prevents the FFC from loping from a gap W formed between the lower cover 7 and the body chassis 2.

When the tray 3 is at the unload position, as shown in FIGS. 2 and 12, a relatively large gap W is generated between the rear end of the lower cover 7b of the thread chassis 5 and a front end of the body chassis 2. As a result, the second portion 17 of the FFC 151 lops and tries to come out from the gap W. However, the support member 21 is mounted to the lower cover 7b of the thread chassis 5 and the projecting portion 25 is located on the side of the lower surface of the second portion 17 of the FFC 15 as shown in FIG. 12, the second portion 17 of the FFC 15 is prevented from loping.

Figure 13:
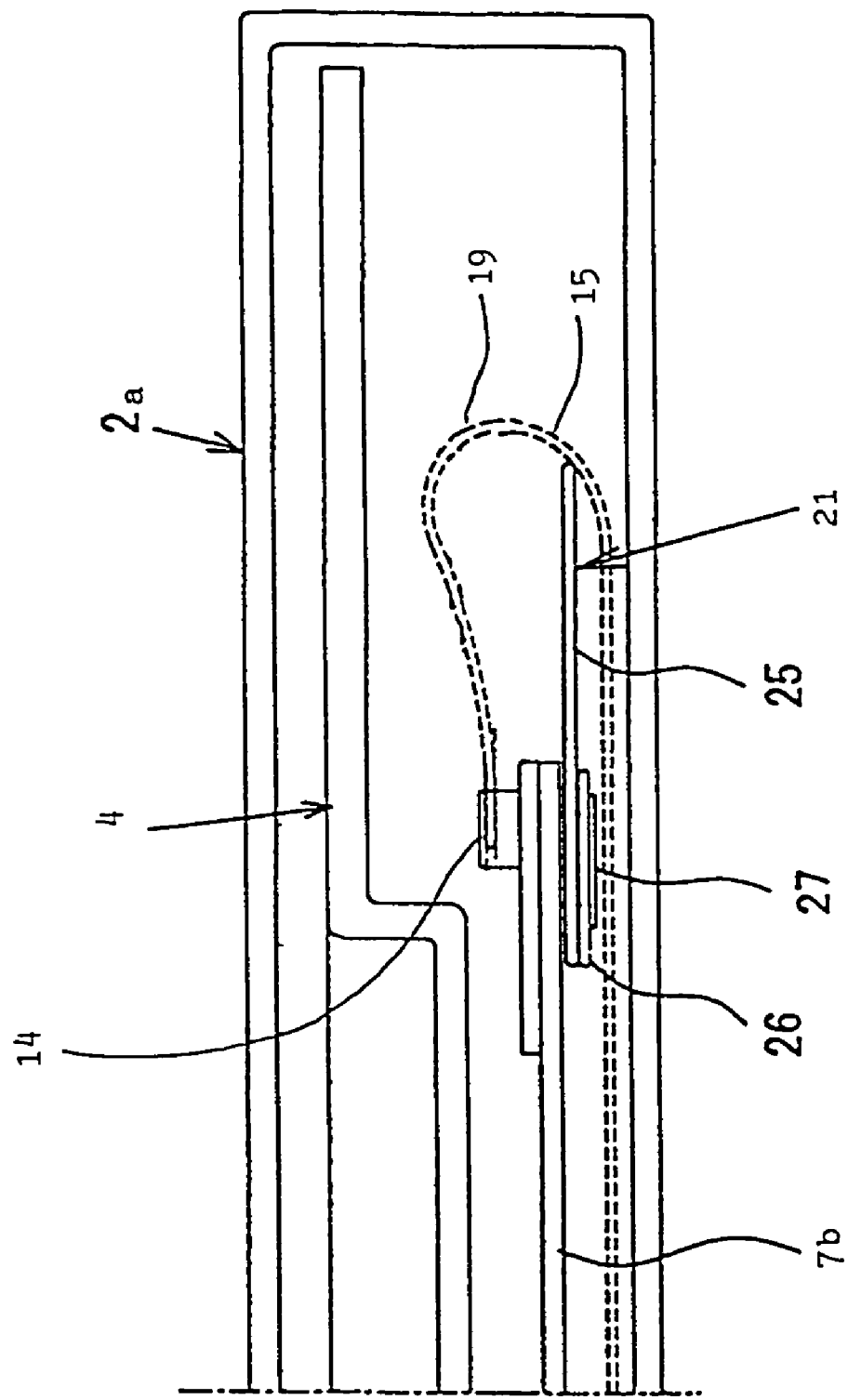
FIG. 13 is a partial side view showing a positional relation between the support member and the FFC shown in FIG. 12 when the tray is at the load position.
Figure 14:
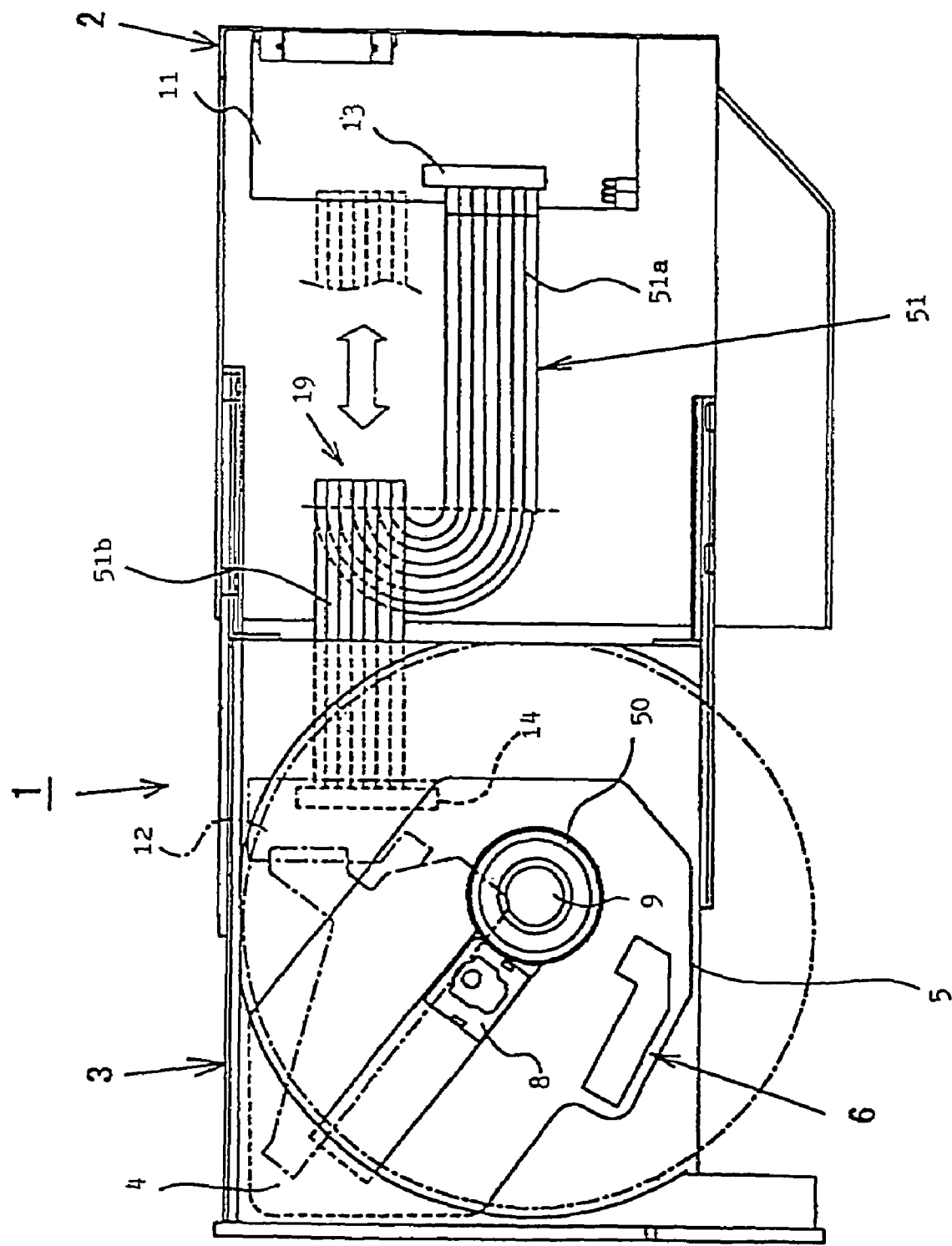
FIG. 14 is a diagram of an example of a conventional disk driving apparatus as viewed from above, the tray is at the unload position, and the upper lid of the body chassis is removed for showing the connection of the inside FPC.
Figure 15:
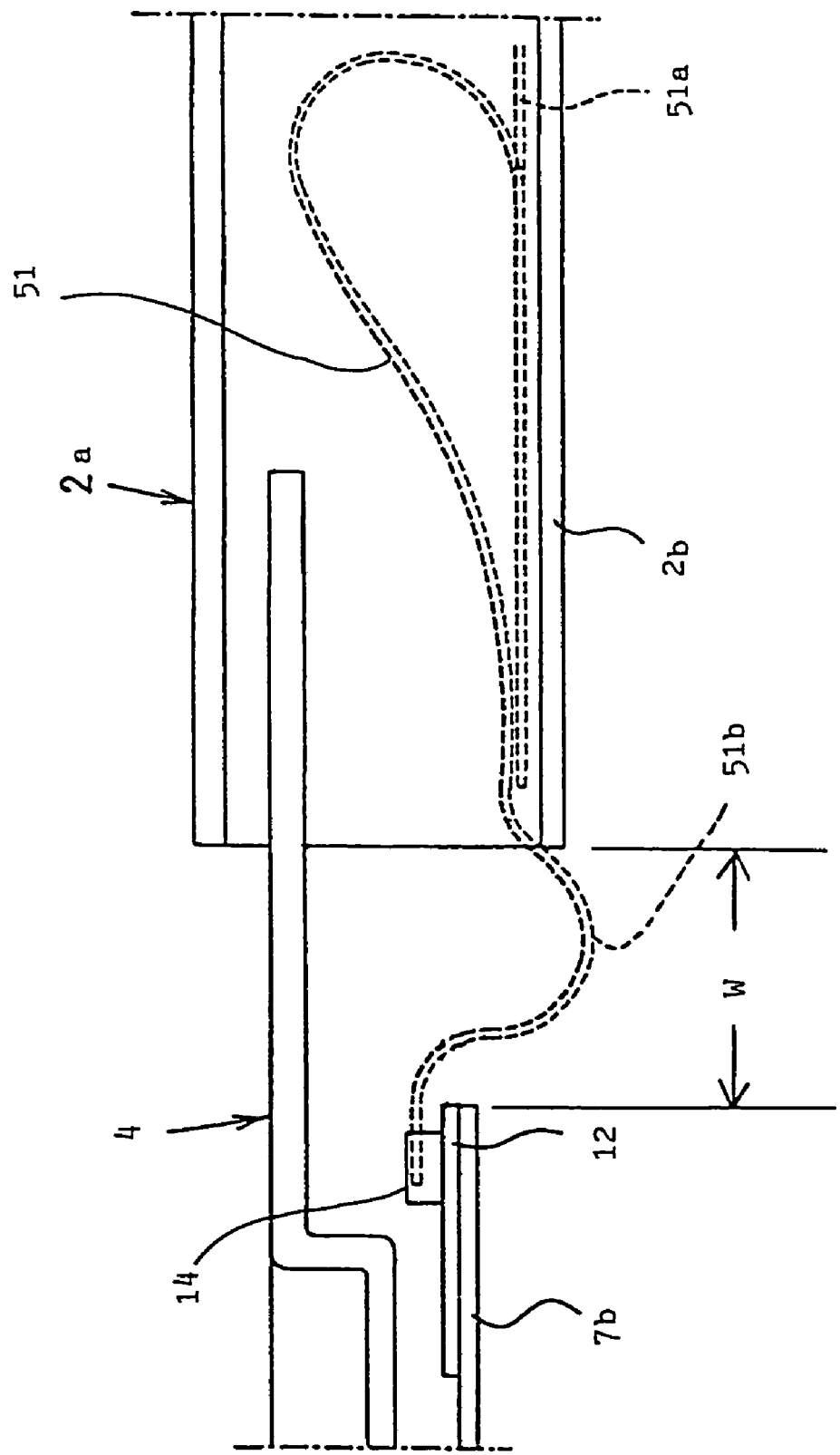
FIG. 15 is a partial side view for explaining that in the conventional disk driving apparatus, when the tray is at the unload position, a part of the FPC lops and protrude from the gap formed between the lower cover of the thread chassis and the body chassis.

When the tray 3 moves from the unload position (FIG. 12) to the load position (FIG. 13) toward the body chassis 2, the projecting portion 25 of the support member 21 also moves backward together with the tray 3, thereby keep preventing the second portion 17 of the FFC 15 from loping. However, since the moving speed of the folded-back curved portion 19 of the FFC 15 is half of the moving speed of the tray 3, when the tray 3 approaches the load position, the projecting portion 25 of the support member 21 catches up with the folded-back curved portion 19 of the FFC 15. When the tray 3 further moves toward the load position, the projecting portion 25 of the support member 21 enters into the folded-back curved portion 19 of the FFC 15, and when the tray 3 reaches the load position, the projecting portion 25 of the support member 21 is pushed forward by the folded-back curved portion 19 of the FFC 15 as shown in FIG. 13, and is resiliently deformed as shown with the dotted line in FIG. 5A.

(Second Example of the Guide Member)

An example of a guide member 20' different from the guide member 20 described above will be explained with reference to FIGS. 7 to 11.

Figure 7:
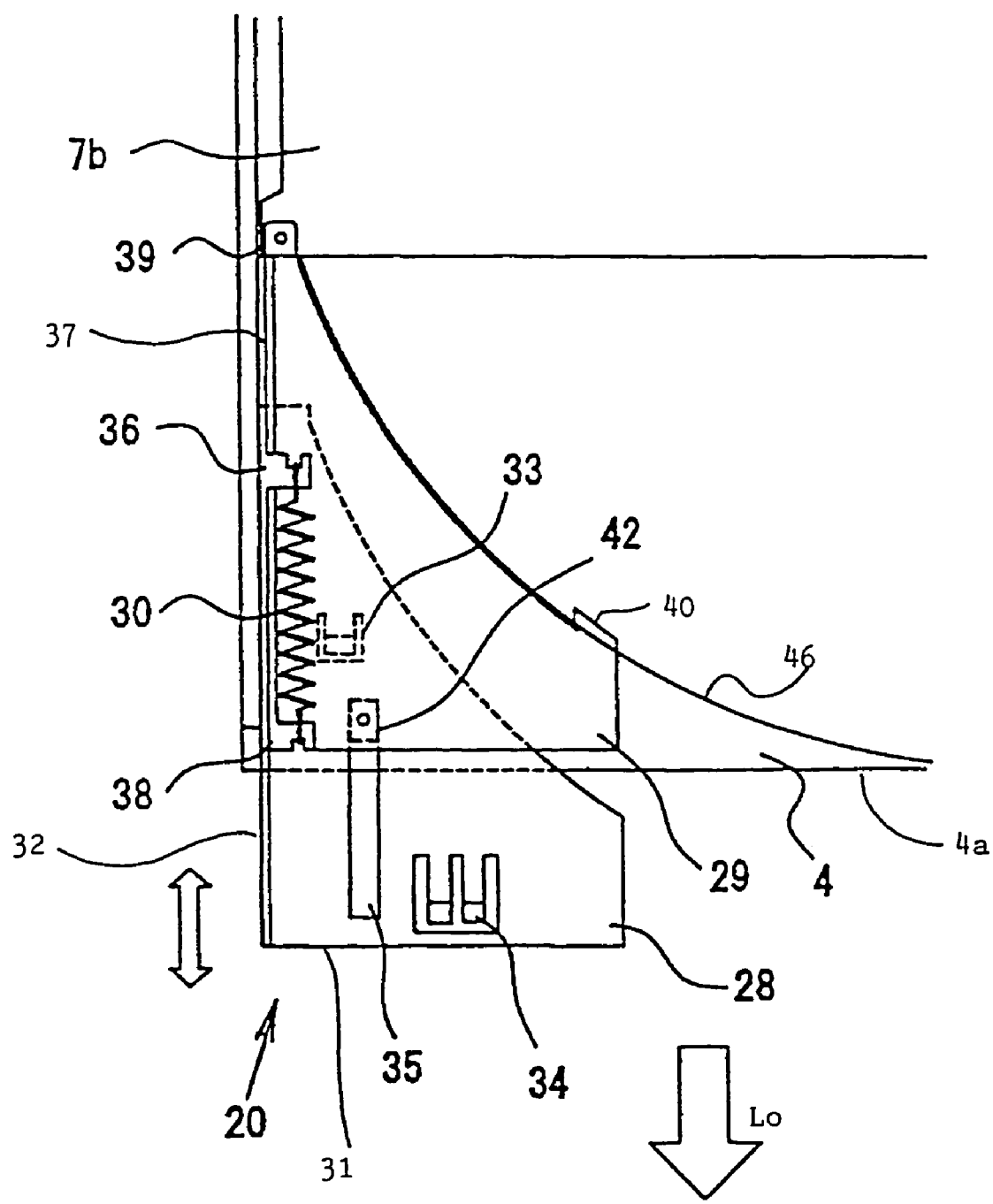
FIG. 7 is a partial plan view showing a guide member of a different structure from the guide member used in the disk driving apparatus shown in FIG. 1.
Figure 10:
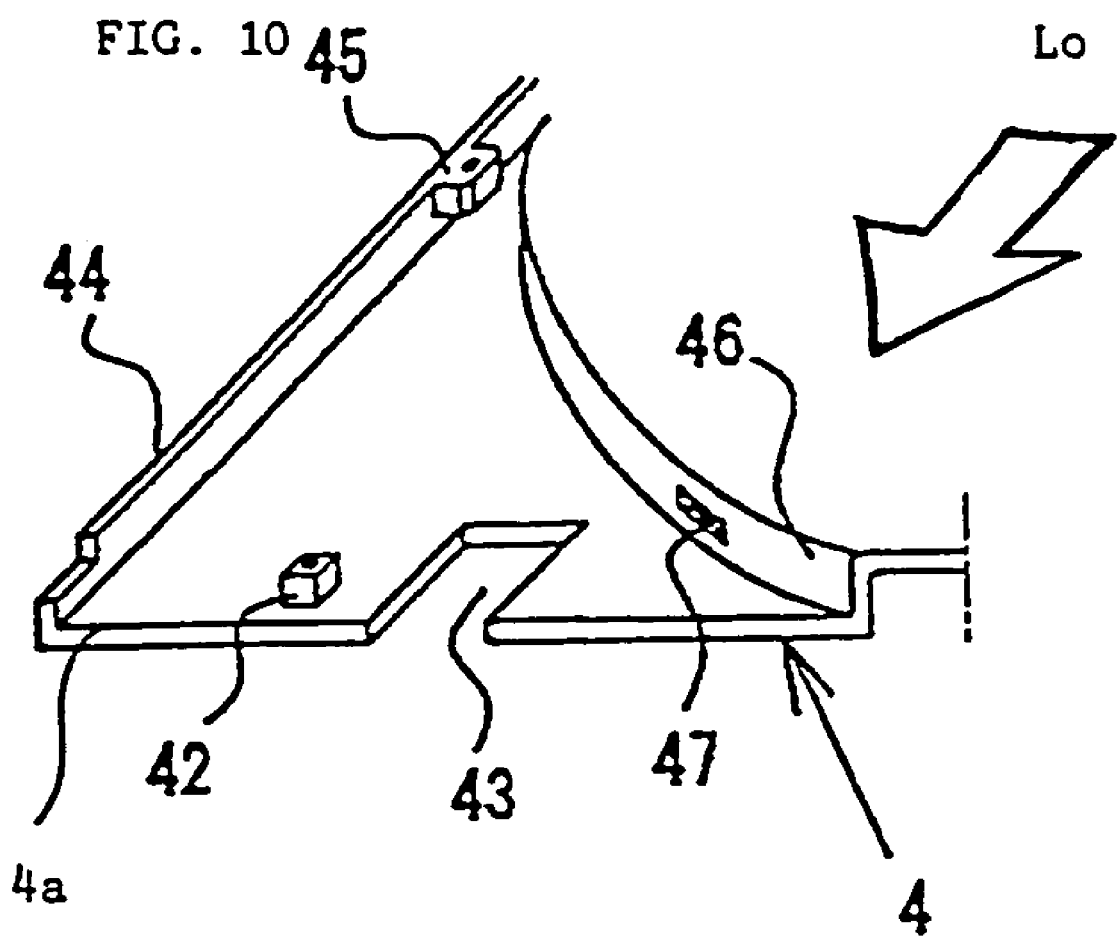
FIG. 10 is a partial view from below of the tray (tray base) to which the guide member shown in FIG. 7 is mounted.

As shown in FIGS. 7 and 10, the guide member 20' of this example is mounted to a substantially triangular portion (hereinafter referred to as triangular plane) of a lower surface of the tray base 4, surrounded by a rear end edge 4a, a left edge (rising edge 44) of the tray base 4 and an outer peripheral wall (arc wall 46) of a disk-receiving recess.

As shown in FIG. 10, the triangular plane of the tray base 4 is provided at its rear end portion with a screw seat 42, and formed with a rectangular notch 43 which opens toward the rear end. A screw seat 45 projects from a portion of the left edge (rising edge 44) of the tray base 4 closer to the arc wall 46. A portion of the arc wall 46 closer to the rear end edge 4a of the tray base 4 is formed with an engaging hole 47.

The guide member 20' comprises a slide plate 28 (FIG. 9) having a substantially triangular plane, a guide plate 29 (FIG. 8) having a substantially triangular plane, and a coil spring 30. Each of the slide plate 28 and the guide plate 29 has a shape corresponding to the triangular plane of the tray base 4.

Figure 9:
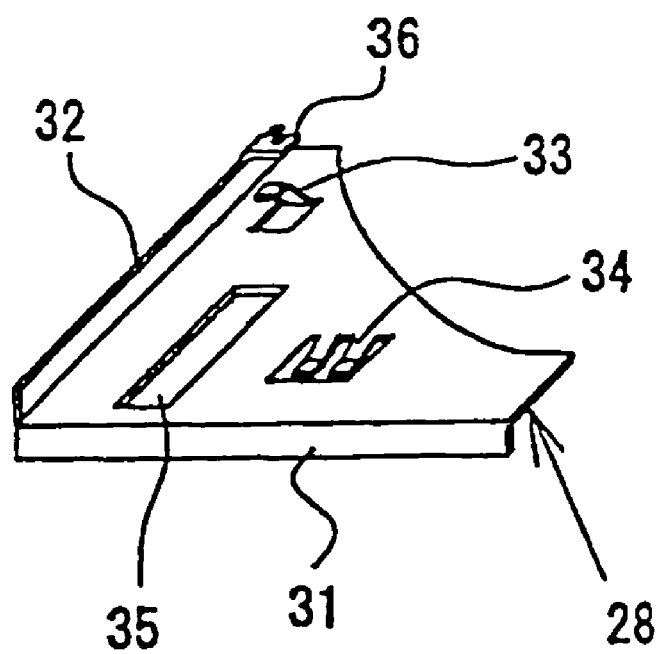
FIG. 9 is a perspective view showing a structure of a guide plate constituting the guide member shown in FIG. 7.
Figure 11:
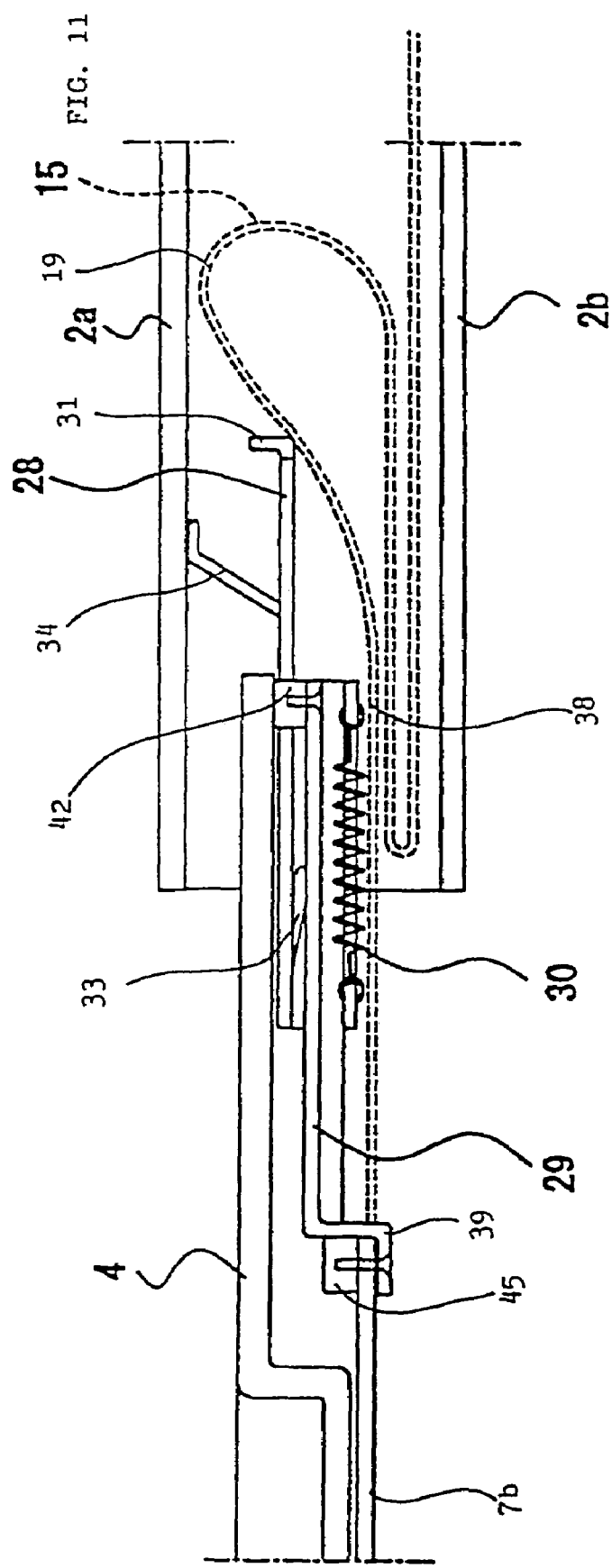
FIG. 11 is a partial side view for explaining that when the tray is at the unload position, the slide plate in the guide member shown in FIG. 7 prevents the slide plate from rising toward the upper lid of the FFC.

As shown in FIG. 9 (and FIG. 7), a plane of the slide plate 28 is formed with a front contact portion 33 and a rear contact portion 34, and a rectangular guide hole 35 extends in the longitudinal direction. The slide plate 28 is formed at its rear end with an engaging edge 31, and at its left end with a guide edge 32. A first spring receiver 36 projects from a front end of the guide edge 32. As shown in FIG. 11, the front contact portion 33 is formed by cutting and rising the plane of the slide plate 28, thereby allowing a pawl to project downward, and the rear contact portion 34 is formed by cutting and rising the plane, thereby allowing a pawl upward.

Figure 8:
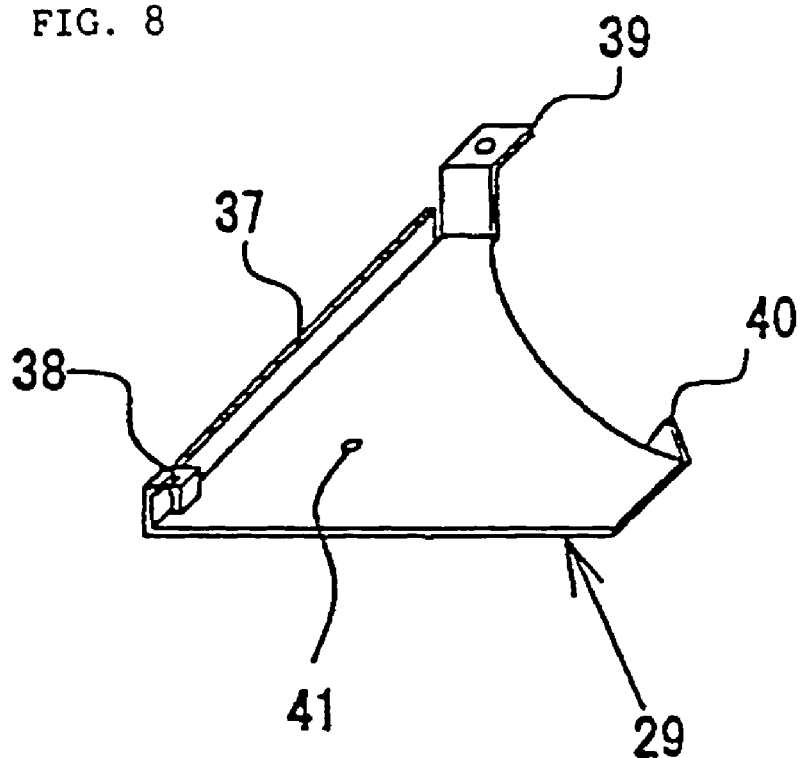
FIG. 8 is a perspective view showing a structure of slide plate constituting the guide member shown in FIG. 7.

As shown in FIG. 8 (and FIG. 7), the guide plate 29 is formed at its left end with a rail edge 37. A second spring receiver 38 projects from a rear end of the rail edge 37. A front end of the guide plate 29 is formed with a mounting portion 39 which is higher than the plane of the guide plate 29. A projection 40 projects from a right end of the guide plate 29 downward. The plane of the guide plate 29 is formed with a screw hole 41.

Thereupon, by bringing the guide hole 35 (FIG. 9) of he slide plate 28 into engagement with the screw seat 42 (FIG. 10) provided on the tray base 4, the slide plate 28 is mounted to the lower surface of the tray base 4 such that the slide plate 28 can slide in the longitudinal direction with respect to the tray base 4 (FIG. 11). At that time, the screw seat 42 functions as a guide when the slide plate 28 slides.

Next, the guide plate 29 (FIG. 8) is superposed on the lower surface of the slide plate 28, the projection 40 is inserted into the engaging hole 47 of the arc wall 46 of the tray base 4, and a screw passing through the screw hole formed in the mounting portion 39 of the guide plate 29 is threaded into the screw seat 45 of the tray base 4 (FIG. 11). Further, the screw passing through the screw hole 41 of the guide plate 29 is threaded into the screw seat 42 of the tray base 4. When the mounting portion 39 of the guide plate 29 is fixed to the screw seat 45 of the tray base 4 by the screw, as shown in FIG. 11, the lower cover 7b of the thread chassis 5 is also fixed to the screw seat 45 of the tray base 4 by the screw.

The guide edge 32 of the slide plate 28 disposed between the tray base 4 and the guide plate 29 is sandwiched between the rail edge 37 of the guide plate 29 and the rising edge 44 of the tray base 4 and can move in the longitudinal direction.

As shown in FIG. 7, the coil spring 30 is extended between the first spring receiver 36 of the slide plate 28 and the second spring receiver 38 of the guide plate 29.

When the tray 3 is at the unload position, or when the tray 3 is moving from the unload position toward the load position, as shown in FIG. 11, the engaging edge 31 of the slide plate 28 and the rear portion connected to the engaging edge 31 project rearward from between the guide plate 29 and the tray base 4 and prevent the second portion 17 of the FFC 15 from swelling toward the upper lid 2a.

When the tray 3 is pushed into the body chassis 2 and reaches the load position, the engaging edge 31 of the slide plate 28 abuts against the body chassis 2 and the slide plate 28 is pushed forward, and is pulled in between the guide plate 29 and the tray base 4. With the motion of this slide plate 28, the coil spring 30 extended between the first spring receiver 36 of the slide plate 28 and the second spring receiver 38 of the guide plate 29 extends. Therefore, in a state in which the tray 3 (tray base 4) is pushed up to the load position and locked, the slide plate 28 of the guide member 20' always pushes the tray 3 toward the load position by resilience of the coil spring 30.

As shown in FIG. 11, the tray 3 moves from the unload position to the load position and the rear contact portion 34 of the slide plate 28 is always in contact with the upper lid 2a, and the front contact portion 33 comes into contact with the guide plate 29. Therefore, the lower cover 7b of the tray base 4 and the body chassis 2 are always electrically conducted through the guide plate 29 and the slide plate 28.

In the example shown in FIG. 7, the coil spring 30 extended between the first spring receiver 36 of the slide plate 28 and the second spring receiver 38 of the guide plate 29 is disposed in parallel to the sliding direction of the tray 3. Alternatively, when the coil spring 30 is disposed at a certain angle with respect to the sliding direction of the tray 3, the resilience of the coil spring 30 acts such as to rotate the tray 3 at the load position on the body chassis 2 (in the horizontal plane) and pushes against the sidewall of the body chassis 2. As a result, shake of the tray 3 with respect to the body chassis 2 is suppressed by the friction between the tray 3 and the sidewall of the body chassis 2.

What is claimed is:

1. A disk driving apparatus having a body chassis, and a tray which can slide between a first position where the tray is pulled out from the body chassis and a second position where the tray is pushed into the body chassis, the apparatus further comprising:
    a flexible electric connection wire for electrically connecting an electronic component mounted to the tray and an electronic component mounted to the body chassis with each other; and
    a guide member disposed between a part of the body chassis and the electric connection wire for preventing the electric connection wire and the body chassis from coming into contact with each other,
    wherein when the tray is separated away from the second position toward the first position by a predetermined distance or more, the guide member projects from the tray to prevent the electric connection wire from coming into contact with the body chassis, and when the tray moves toward the second position and a distance between the tray and the second position becomes the predetermined or less, a projecting amount of the guide member from the tray is reduced.

2. The disk driving apparatus according to claim 1, wherein the guide member functions as a pushing spring for pushing out the tray toward the first position.

3. The disk driving apparatus according to claim 1 or 2, wherein by bringing a portion of the guide member into contact with the body chassis, a conductive member of the tray and a conductive part of the body chassis are electrically connected with each other through the guide member.

4. The disk driving apparatus according to claim 3, wherein
    when the tray moves between the first position and the second position, the guide member is always in contact with the body chassis.

5. The disk driving apparatus according to claim 1 or 2, wherein when the tray is at the second position, the tray is always pushed by the guide member against the body chassis in a direction in which the tray rotates.

6. The disk driving apparatus according to claim 1 or 2, wherein the guide member is a slide plate which can slide with respect to the tray.

7. The disk driving apparatus according to claim 1 or 2, further comprising a support member which guides a surface of the electric connection wire opposite from a surface which is guided by the guide member as the tray moves.

8. The disk driving apparatus according to claim 7, wherein the support member is provided on the tray.

9. The disk driving apparatus according to any one of claims 1, 2 or 8, wherein the guide member is formed of linear spring member.

10. The disk driving apparatus according to claim 9, wherein the guide member is formed of a twisted coil spring.

11. The disk driving apparatus according to claim 10, wherein the guide member comprises a ring portion having a coil-shape which is disposed in the tray and wound at least once, a support portion formed integrally with the ring portion and disposed in the tray, and a projecting portion which is integrally formed with the ring portion and which projects from the tray, the projecting portion preventing the electric connection wire from being connected to the body chassis.

12. The disk driving apparatus having a body chassis, and a tray which can slide between a first position where the tray is pulled out from the body chassis and a second position where the tray is pushed into the body chassis, the disk apparatus further comprising a support member for limiting a position in a height direction of the electric connection wire which projects from inside to outside of the body chassis together with the tray and is exposed to the outside of said body chassis and said tray.

13. The disk driving apparatus according to claim 7 or 12, wherein the support member includes a position-limiting section which abuts against the electric connection wire and limits its position, at least the position-limiting section can move in the moving direction of the tray.

14. The disk driving apparatus according to claim 13, wherein the support member includes a spring portion which pushes the position-limiting section toward the second position.

15. The disk driving apparatus according to claim 14, wherein the support member is integrally formed with the position-limiting section and the spring portion.

16. The disk driving apparatus according to claim 15, wherein the support member is integrally formed with a spring wire material.

17. The disk driving apparatus according to claim 16,
    wherein the electric connection wire includes a U-shaped folded-back portion which is opened toward the first position as viewed from a lateral direction of the tray, and when the support member abuts against an inner side of the U-shaped folded-back portion, the position-limiting section is moved toward the first position against a pushing force of the spring.

18. The disk driving apparatus according to any one of claims 1, 2 or 12, wherein the electric connection wire is a flexible printed cable (FPC).

19. The disk driving apparatus according to any one of claims 1, 2 or 12, wherein the electric connection wire is a flexible flat cable (FFC).

* * * * *